(12) United States Patent
Berard

(10) Patent No.: US 8,714,558 B2
(45) Date of Patent: May 6, 2014

(54) WELDED BELLOWS SEAL ASSEMBLY

(75) Inventor: Gerald M. Berard, North Providence, RI (US)

(73) Assignee: Eaton Corporation, Cleveland, OH (US)

( * ) Notice: Subject to any disclaimer, the term of this patent is extended or adjusted under 35 U.S.C. 154(b) by 444 days.

(21) Appl. No.: 12/895,294

(22) Filed: Sep. 30, 2010

(65) Prior Publication Data

US 2012/0080851 A1    Apr. 5, 2012

(51) Int. Cl.
    *F16J 15/34*    (2006.01)
(52) U.S. Cl.
    USPC .......................................... 277/377; 277/358
(58) Field of Classification Search
    USPC ........................... 277/390, 391, 352, 358, 377
    See application file for complete search history.

(56) References Cited

U.S. PATENT DOCUMENTS

| | | |
|---|---|---|
| 1,366,879 A | 1/1921 | Dennedy |
| 1,602,177 A | 10/1926 | Spreen |
| 2,191,232 A | 2/1940 | Heinen |
| 2,586,739 A | 2/1952 | Summers |
| 2,949,322 A | 8/1960 | Closs |
| 3,276,780 A | 10/1966 | Andresen et al. |
| 3,372,939 A * | 3/1968 | Coulombe et al. ............ 277/391 |
| 3,383,116 A | 5/1968 | Carter |
| 3,490,818 A * | 1/1970 | Bonner .......................... 277/411 |
| 3,515,394 A | 6/1970 | Stevens |
| 4,163,563 A | 8/1979 | Mullaney |
| 4,365,816 A | 12/1982 | Johnson et al. |
| 4,453,722 A | 6/1984 | Swanson |
| 4,477,088 A | 10/1984 | Picard |
| 4,973,065 A | 11/1990 | Habich |
| 5,344,164 A | 9/1994 | Carmody et al. |
| 5,538,259 A | 7/1996 | Uhrner et al. |
| 5,873,574 A * | 2/1999 | Ringer .......................... 277/389 |
| 5,901,965 A * | 5/1999 | Ringer et al. .................. 277/369 |
| 5,954,341 A * | 9/1999 | Ringer et al. .................. 277/361 |
| 7,611,151 B2 * | 11/2009 | Casucci et al. ................ 277/390 |
| 2005/0035554 A1 * | 2/2005 | Roberts et al. ................ 277/358 |
| 2007/0235945 A1 * | 10/2007 | Casucci et al. ................ 277/390 |

* cited by examiner

*Primary Examiner* — Gilbert Lee
(74) *Attorney, Agent, or Firm* — Dykema Gossett PLLC

(57) ABSTRACT

A welded bellows seal assembly is provided. In an embodiment, a welded bellows seal assembly includes a seal ring including a seal ring shell, an outer housing; and a bellows extending from a portion of the seal ring shell to a portion of the outer housing. The seal ring shell may include a bellows segment that extends longitudinally over the bellows. Moreover, in embodiments, the bellows may be connected to the seal ring at a lower inner diameter portion of the seal ring shell. Embodiments of the seal assembly may permit the tuning of the seal assembly to improve resistance physical effects, such as twisting, under anticipated operational conditions.

16 Claims, 4 Drawing Sheets

WELDED BELLOWS SEAL ASSEMBLY

TECHNICAL FIELD

The present invention relates in general to welded bellows seals and assemblies, including seals and assemblies for sealing about an axis of rotation.

BACKGROUND

Edge welded bellows seals are used in various applications, including commercial and military applications, for sealing fluids. Many applications involve the sealing of fluids in connection with rotating devices and machinery. Edge welded bellows seals, which are also referred to as "non-pusher" type seals, are often utilized for applications with various speeds, pressures, and fluid conditions, as well as in higher operating temperatures and conditions, including conditions in which low hysteresis is desired.

It has been observed, however, that during high temperature conditions, the reaction due to an imbalance of materials or their distribution may result in an adverse twisting moment. Such conditions may lead to seal face coning, and can affect the operation of the seal.

SUMMARY

A welded bellows seal assembly that can provide improved operational characteristics is disclosed. In an embodiment, a welded bellows seal assembly includes a seal ring including a seal ring shell, an outer housing; and a bellows extending from a portion of the seal ring shell to a portion of the outer housing. The seal ring shell may include a bellows segment that extends longitudinally over the bellows. Moreover, in embodiments, the bellows may be connected to the seal ring at a lower inner diameter portion of the seal ring shell.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
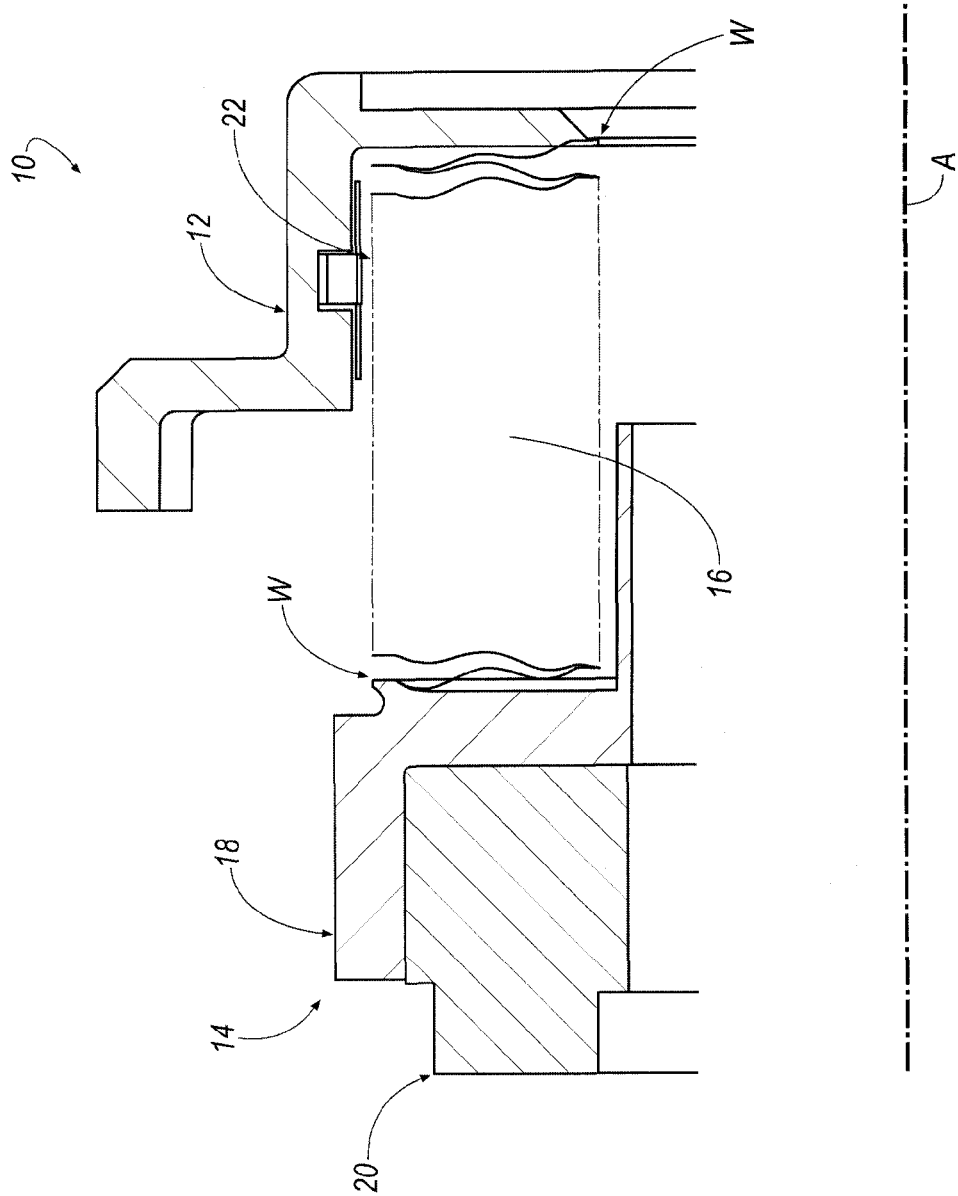
FIG. 1 is a cross sectional view of a conventional edge-welded metal bellows seal.

With reference to FIG. 1, a cross sectional view of a conventional edge-welded metal bellows seal assembly 10 is generally depicted. The depicted seal assembly 10 includes an outer housing 12, a composite seal ring 14, and a bellows 16. The seal ring 14 includes a generally "L"-shaped or an "S"-shaped (as shown) metallic seal ring shell 18 and a carbon-graphite insert 20. The insert 20 is commonly press fit into the metallic seal ring shell 18. The bellows 16 extends from a portion of the seal ring shell 18 to a portion of the outer housing 12. Weld joints W are generally provided as indicted at or about each longitudinal end of the bellows 16. A damper strip 22 is generally shown adjacent a portion the outer housing 12 and radially outward of the bellows 16. An axis of rotation A is generally shown for rotational context.

Figure 1A:
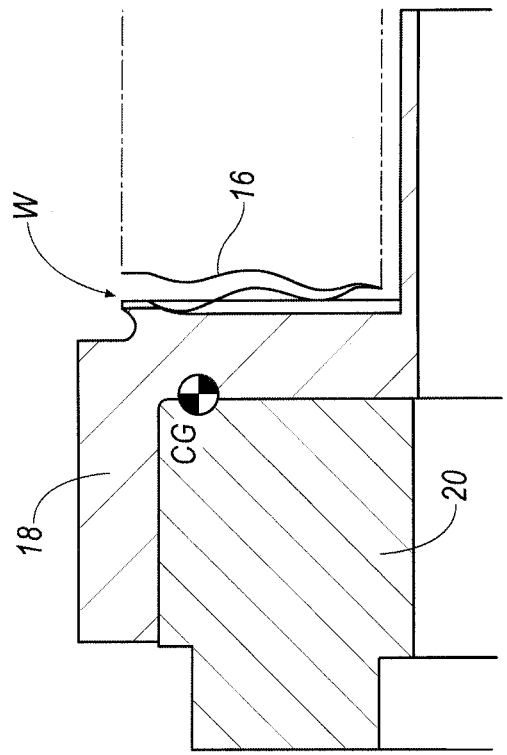
FIG. 1A is an enlarged partial cross sectional view of a weld joint associated with FIG. 1.

FIG. 1A is an enlarged partial cross sectional view of a weld joint associated with FIG. 1. As generally shown, the weld joint W is provided at a radially outward edge portion of the bellows 16 (i.e., the weld may be said to generally be on the outside diameter). As depicted, the associated cross-sectional center of gravity CG for the seal ring 14 and the bellows 16 for such a conventional-type configuration is approximately located to the left of the weld joint W.

Figure 2A:
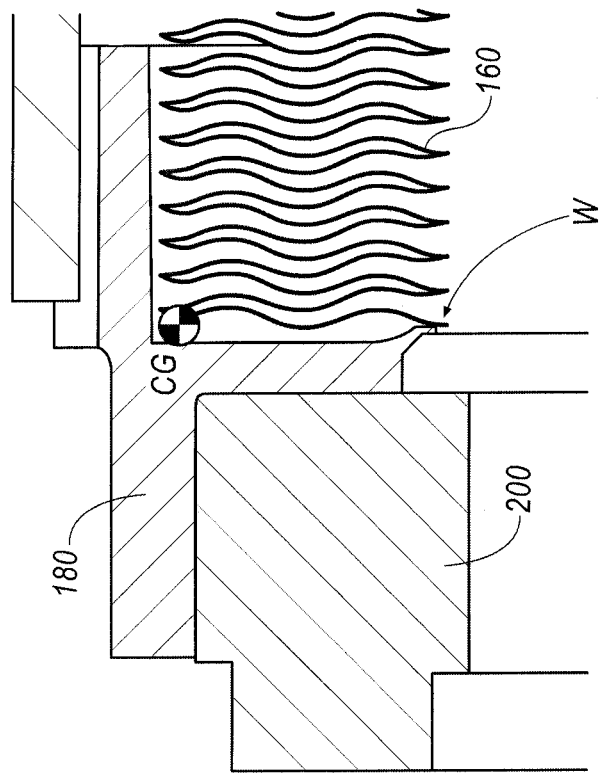
FIG. 2A is an enlarged partial cross sectional view of a weld joint associated with FIG. 2.
Figure 2:
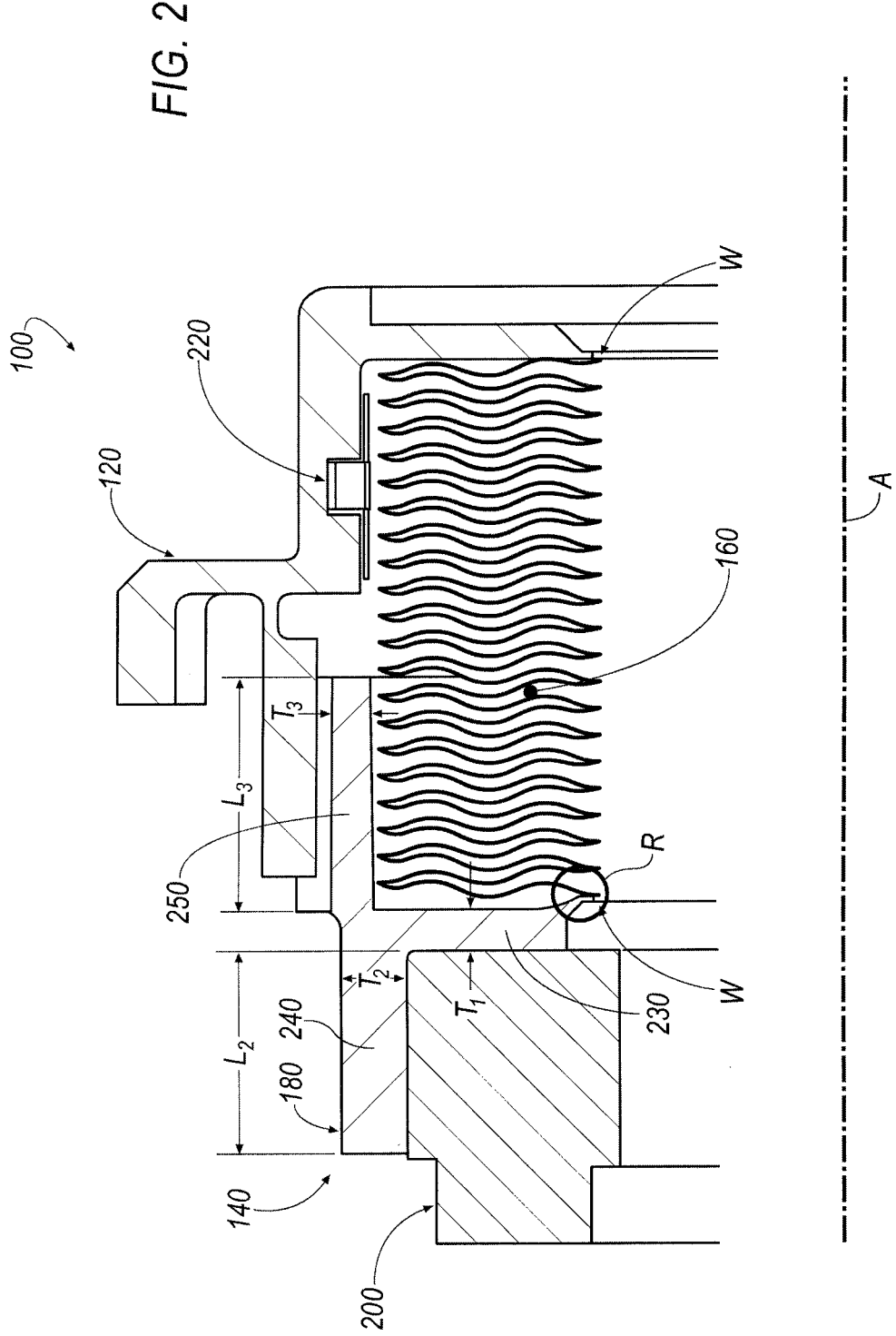
FIG. 2 is a cross sectional view of an embodiment of a welded bellows seal generally illustrating teaching of the present invention.
Figure 3:
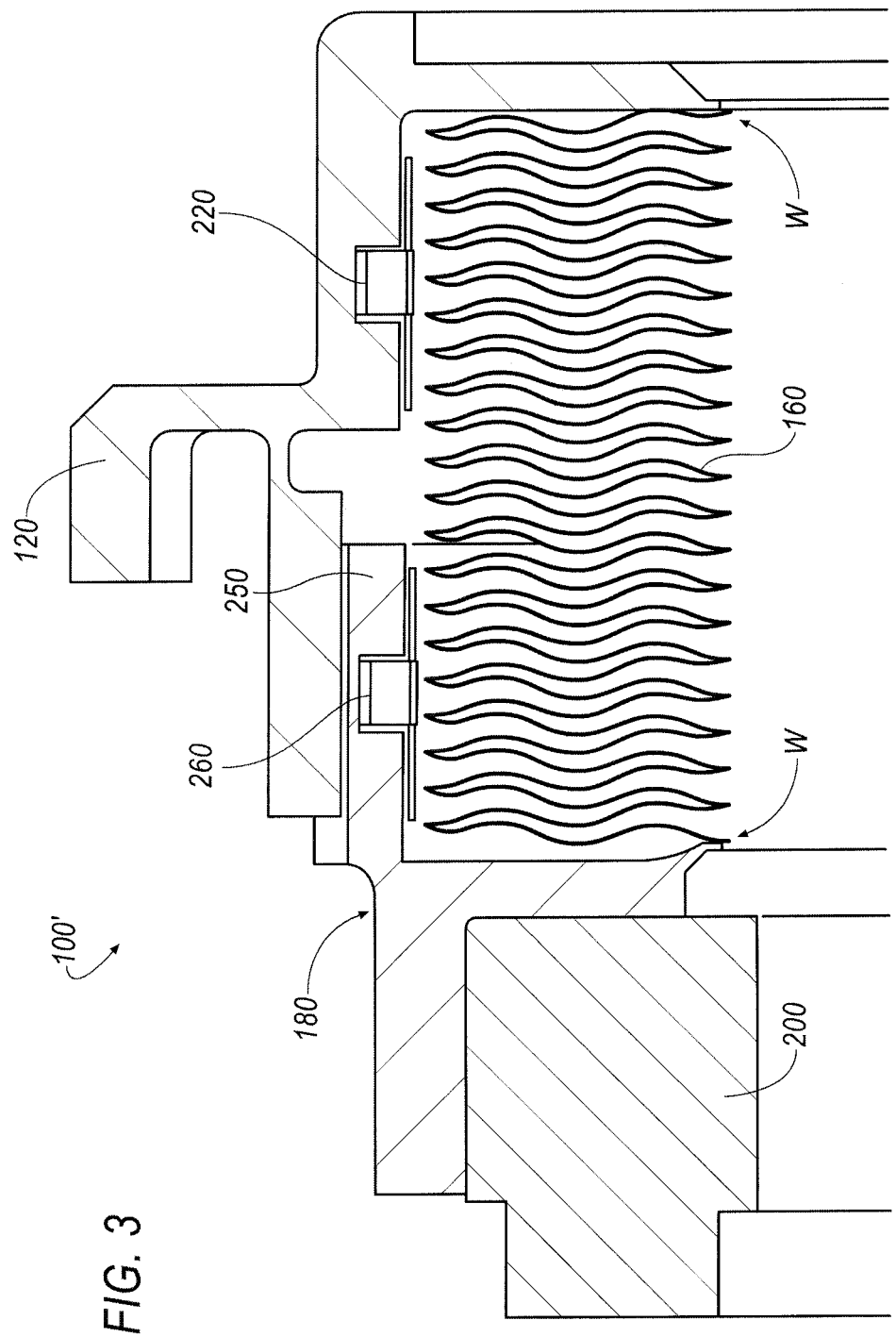
FIG. 3 is a cross sectional view of another embodiment of a welded bellows seal generally illustrating additional teachings of the present invention.

An embodiment of a welded bellows seal assembly 100 generally illustrating aspects and teachings of the invention is shown in FIG. 2. The seal assembly 100 includes an outer housing 120, a composite seal ring 140, and a bellows 160. The seal ring 140 comprises a seal ring shell 180 and an insert 200. The assembly may optionally include a damper strip 220 that, as generally shown, may be provided between a portion of the bellows 160 and a portion of the outer housing 120. In the illustrated embodiment, the damper strip 220 is shown in connection with the outer housing 120; however, such a damper strip may be provided in alternate locations, such as on the seal ring shell 180 (see, e.g., FIG. 3). An axis of rotation A is generally shown for rotational context.

The insert 200 may be press fit into seal ring shell 180. In an embodiment, the insert 200 may be comprised of a carbon graphite material, and the seal ring shell 180 may be comprised of metal. As generally illustrated, the seal ring shell 180 may be generally "T"-shaped, including a radial segment 230, an insert segment 240, and a bellows segment 250. Further, as generally shown, segments 230, 240, 250 may have cross-sectional thicknesses, generally identified as $T_1$, $T_2$, and $T_3$, respectively. With further reference to the segments of the seal ring shell 180, longitudinal lengths of segments 240 and 250 are generally identified as $L_2$ and $L_3$, respectively.

With continued reference to the embodiment generally illustrated in FIG. 2, the bellows 160 may extend from a portion of the seal ring shell 180 to a portion of the outer housing 120 (or instead to a sealed component connected to the outer housing). Weld joints W may be provided as generally illustrated at or about each longitudinal end of the bellows 160 at or about a radially inward position relative to axis A (i.e., the weld may be said to generally be on or about the inside diameter). That is, for embodiments, the bellows 160 may be connected to the seal ring shell 180 at a lower inner diameter portion (e.g., within region R) of the seal ring shell.

With a configuration such as illustrated in FIG. 2, the center of gravity CG for the seal ring 140 can be intentionally moved to the right (i.e., toward the illustrated outer housing 120). The CG for the FIG. 2 embodiment can, therefore, be located more in-line with, or even to the right of, the weld location W associated with the connection to the seal ring shell (see, e.g., FIG. 2A).

Various embodiments of the invention permit the "tuning" of the seal ring 140 and assembly. For example, among other things, the present invention permits modification to the seal ring shell to move the associated center of gravity and better "tune" the assembly for an intended operational environment. In an embodiment, the design of the seal ring shell 180 may be optimized to prevent twisting under anticipated conditions. Such optimization, or "tuning," may be effectuated, for example and without limitation, by modifying one or more of the thickness(es) (e.g. $T_1$, $T_2$, and/or $T_3$) and/or length(s) (e.g., $L_2$ and/or $L_3$) of segments 230,240,250 of the seal ring shell 180. By positioning the center of gravity of the cross section, convergent and divergent coning can be improved or optimized for various operating conditions. Moreover, much of the design work may be performed using calculations and predictor models and the resultant designs may be separately tested and confirmed, e.g., by prototype testing.

In the illustrated embodiment, the thickness $T_3$ of bellows segment 250 is shown as being just slightly thicker than thickness $T_1$ of bellows segment 230, and less than two-thirds of the thickness of thickness $T_3$ of bellows segment 250. Further, as generally shown, the longitudinal length $L_3$ of segment 250 may be noticeably longer than the longitudinal length $L_2$ of segment 240. The shapes of the segments are generally rectangular. Moreover, in embodiments, such as that illustrated, the longitudinal length $L_3$ of segment 250 may extend longitudinally over more than one-third of the longitudinal length of the bellows (e.g., the length between the illustrated weld points). It is, however, noted that the shapes and/or relative dimensions of the segments of the seal ring shell 180 are not limited to those illustrated, and may be modified to provide various desired performance characteristics.

It is further noted that by providing the weld joints W, such as where illustrated in FIG. 2, more of a gap (e.g., between the seal ring shell and the housing) may be provided close to the bellows. The squeezing in and out of air/fluid may, in turn, provide an added dampening effect. For example, during normal seal operation, the bellows (or bellows core) may be subjected to mechanical and pressure pulsations that can cause the seal to become dynamically less stable, i.e., may cause the bellows to resonate. By providing a cover to the outside diameter of the bellows, i.e., the structural extent over the longitudinal length of the bellows (e.g., the combined "cover" provided by the bellows segment 250 and a connecting or overlapping portion of housing 120) air or fluid entrapped between the convolutes, when exhausted on intake, can provide a dampening effect, and consequently help provide a more dynamically stable seal operation. Additionally, one or more damper strips may be mounted in this cover to provide further mechanical dampening effect. By way of example, without limitation, FIG. 3 generally illustrates an embodiment of a welded bellows seal assembly 100' including two damper strips 220, 260. While a plurality of damper strips may be provided in various positions or locations, as generally shown in the illustrated embodiment, a first damper strip 220 may be provided in connection with the housing 120, and a second damper strip 260 may be provided in connection with the bellows segment 250 of the seal. If desired, such first and second damper strips 220, 260 may be provided so as to be similar in size and may positioned to provide a substantial measure of symmetry with respect to their positioning relative to the bellows.

For larger diameter seals, e.g., seals with diameters greater than 1.5 inches, coning due to predominantly thermal conditions may become increasingly more significant. For some applications, if desired, the materials comprising the seal ring shell 180, the bellows 160, and the outer housing 120 may be comprised of the same materials. However, for many applications, including most aerospace applications, the material and material properties for each component may differ. For some applications, the thermal growth between a metal bellows and a carbon-graphite insert may differ by a factor of about 3, depending upon the temperature. For some embodiments, the thermal growth coefficients between the insert material and the seal ring shell may be nominally matched.

It is noted that embodiments of welded bellows seals of the type disclosed herein may be designed to operate in non-oxidizing environments and temperatures in excess of 1000° F. For a number of embodiments, the limiting design factor is the insert.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed is:

1. A welded bellows seal assembly, comprising:
   a seal ring including a seal ring shell;
   an outer housing; and
   a bellows extending from a portion of the seal ring shell to a portion of the outer housing;
   wherein the seal ring shell includes a bellows segment that extends longitudinally over the bellows; and the bellows is connected to the seal ring shell at a lower inner diameter portion of the seal ring shell;
   wherein the seal ring shell has a center of gravity, and the center of gravity of the seal ring shell is longitudinally in line with or to the bellows-side of the point of connection of the bellows and the seal ring shell.

2. The seal assembly of claim 1, wherein the seal ring shell is substantially T-shaped.

3. The seal assembly of claim 1, wherein the center of gravity of the seal ring shell is configured to be located longitudinally over a portion of the bellows.

4. The seal assembly of claim 1, wherein the seal ring shell includes a radial segment and a bellows segment.

5. The seal assembly of claim 4, wherein the cross-sectional thickness of the bellows segment is thicker than the cross-sectional thickness of the radial segment.

6. The seal assembly of claim 4, wherein the bellows segment extends over less than one-half of the axial length of the bellows.

7. The seal assembly of claim 1, wherein a portion of the seal ring shell extends longitudinally beyond the outer housing.

8. The seal assembly of claim 1, including a damper strip provided between a portion of the bellows and a portion of the outer shell.

9. The seal assembly of claim 1, including a plurality of damper strips provided between a portion of the bellows and a portion of the outer shell.

10. The seal assembly of claim 1, wherein the seal ring shell, the bellows, and the outer housing are comprised of different materials.

11. The seal assembly of claim 1, wherein the seal ring shell, the bellows, and the outer housing are comprised of the same materials.

12. The seal assembly of claim 1, wherein the seal ring includes a seal ring insert.

13. The seal assembly of claim 12, wherein the seal ring insert is comprised of a carbon graphite material.

14. The seal assembly of claim 1, wherein the seal ring shell is comprised of metal.

15. The seal assembly of claim 1, wherein the center of gravity of the seal ring shell is provided or positioned to prevent twisting under operational conditions.

16. The seal assembly of claim 1, wherein the outer housing comprises a single, unitary-formed component.

* * * * *